(12) United States Patent
Fondeur et al.

(10) Patent No.: US 11,994,718 B2
(45) Date of Patent: May 28, 2024

(54) MACH-ZEHNDER INTERFEROMETER WITH MIRRORED FACET

(71) Applicant: Lumentum Operations LLC, San Jose, CA (US)

(72) Inventors: Barthelemy Fondeur, San Jose, CA (US); Hiroaki Yamada, San Jose, CA (US); Jiamin Zheng, Ottawa (CA)

(73) Assignee: Lumentum Operations LLC, San Jose, CA (US)

( * ) Notice: Subject to any disclaimer, the term of this patent is extended or adjusted under 35 U.S.C. 154(b) by 685 days.

(21) Appl. No.: 17/129,252

(22) Filed: Dec. 21, 2020

(65) Prior Publication Data

US 2021/0364703 A1 Nov. 25, 2021

Related U.S. Application Data

(60) Provisional application No. 63/027,505, filed on May 20, 2020.

(51) Int. Cl.
| | | |
|---|---|---|
| *G02B 6/293* | (2006.01) | |
| *G02B 6/12* | (2006.01) | |
| *G02F 1/21* | (2006.01) | |

(52) U.S. Cl.
CPC .......... *G02B 6/2935* (2013.01); *G02F 1/212* (2021.01); *G02B 2006/12159* (2013.01)

(58) Field of Classification Search
CPC ........ G02B 6/2935; G02B 2006/12159; G02B 2006/12104; G02B 6/2861; G02B 6/2817; G02B 6/122; G02B 6/4214; G02B 6/136; G02B 6/12002; G02B 6/12176; G02B 6/4206; G02B 6/3512; G02F 1/212; G02F 1/225; G02F 2201/20; G01B 9/02051; G01B 2290/35; G01B 2290/40
See application file for complete search history.

(56) References Cited

U.S. PATENT DOCUMENTS

| | | | | |
|---|---|---|---|---|
| 5,852,687 | A * | 12/1998 | Wickham | G02B 6/2861 385/16 |
| 6,018,390 | A * | 1/2000 | Youmans | G01P 15/093 356/477 |
| 6,108,472 | A | 8/2000 | Rickman et al. | |
| 6,144,449 | A * | 11/2000 | Knuettel | G01B 9/0209 356/450 |
| 10,345,233 | B2 * | 7/2019 | Bennett | G01N 21/45 |
| 2002/0054726 | A1 * | 5/2002 | Fondeur | G02B 6/125 385/39 |
| 2005/0237538 | A1 * | 10/2005 | Belleville | G01B 9/02065 356/504 |

(Continued)

OTHER PUBLICATIONS

Brandon Redding, et al.; "Evanescently coupled multimode spiral spectrometer"; Journal; Sep. 2016; pp. 956-962; vol. 3; No. 9; Optical Society of America.

*Primary Examiner* — Michael A Lyons
(74) *Attorney, Agent, or Firm* — Harrity & Harrity, LLP

(57) ABSTRACT

In some implementations, a Mach-Zehnder interferometer (MZI) includes a delay line arm formed in a chip and a mirrored facet formed in the chip. The delay line arm may be configured to propagate light to the mirrored facet. The mirrored facet may be configured to reflect, to the delay line arm, a percentage of the light propagated to the mirrored facet by the delay line arm.

20 Claims, 11 Drawing Sheets

(56) References Cited

U.S. PATENT DOCUMENTS

| | | | | |
|---|---|---|---|---|
| 2006/0034569 A1* | 2/2006 | Shih | ............... | G01D 5/35383 |
| | | | | 385/12 |
| 2012/0195544 A1* | 8/2012 | Shen | ............... | H04B 10/677 |
| | | | | 359/325 |
| 2014/0118748 A1* | 5/2014 | Rubio Guivernau | ............... | |
| | | | | G02B 6/3586 |
| | | | | 385/2 |
| 2014/0125983 A1* | 5/2014 | Nitkowski | ............ | G01J 3/4531 |
| | | | | 356/450 |
| 2017/0229840 A1* | 8/2017 | Lambert | ............ | G02B 6/12007 |
| 2017/0328702 A1* | 11/2017 | Vossough | .............. | B81B 3/0083 |
| 2017/0363412 A1* | 12/2017 | Womack | ................ | G01V 8/02 |
| 2018/0335575 A1* | 11/2018 | Gudeman | ............ | G02B 6/3608 |

* cited by examiner

MACH-ZEHNDER INTERFEROMETER WITH MIRRORED FACET

RELATED APPLICATION

This application claims priority to U.S. Provisional Patent Application No. 63/027,505, filed on May 20, 2020, and entitled "COMPACT INTEGRATED DELAY LINE DESIGN FOR AN INTERFEROMETER," the content of which is incorporated by reference herein in its entirety.

TECHNICAL FIELD

The present disclosure relates to a Mach-Zehnder interferometer (MZI) and, for example, to an MZI with a mirrored facet.

BACKGROUND

A conventional delay line MZI includes a delay line arm and a non-delay line arm, where the delay line arm is longer than the non-delay line arm. Typically, the delay line MZI splits an optical signal and causes a first portion of the optical signal to propagate via the delay line arm and a second portion of the optical signal to propagate via the non-delay line arm. The delay line MZI then combines the first portion of the optical signal and the second portion of the optical signal into a combined optical signal. Because an optical path for the delay line arm is longer than an optical path for the non-delay line arm, the first portion of the optical signal is time delayed in comparison to the second portion of the optical signal when combined into the combined optical signal.

SUMMARY

In some implementations, an MZI includes a delay line arm formed in a chip configured to propagate light to a mirrored facet formed in the chip; and the mirrored facet configured to reflect, to the delay line arm, a percentage of the light propagated to the mirrored facet by the delay line arm.

In some implementations, an MZI includes a first mirrored facet formed in a chip; a second mirrored facet formed in the chip; an optical transmission element formed in the chip; a delay line waveguide formed in the chip that is connected between the optical transmission element and the first mirrored facet; and a non-delay line waveguide formed in the chip that is connected between the optical transmission element and the second mirrored facet.

In some implementations, an optical device comprising: a substrate; a first MZI formed on the substrate, comprising: a first delay line arm, and a first mirrored facet positioned at an end of the first delay line arm; and a second MZI formed on the substrate, comprising: a second delay line arm, and a second mirrored facet positioned at an end of the second delay line arm.

In some implementations, an MZI includes a first mirrored facet; a second mirrored facet; a delay line arm configured to propagate a first portion of an optical beam to the first mirrored facet; and a non-delay line arm configured to propagate a second portion of the optical beam to the second mirrored facet, wherein: a length of the delay line arm is greater than a length of the non-delay line arm; the first mirrored facet is configured to reflect a percentage of the first portion of the optical beam to the delay line arm; and the second mirrored facet is configured to reflect a percentage of the second portion of the optical beam to the non-delay line arm.

DETAILED DESCRIPTION

Figure 1:
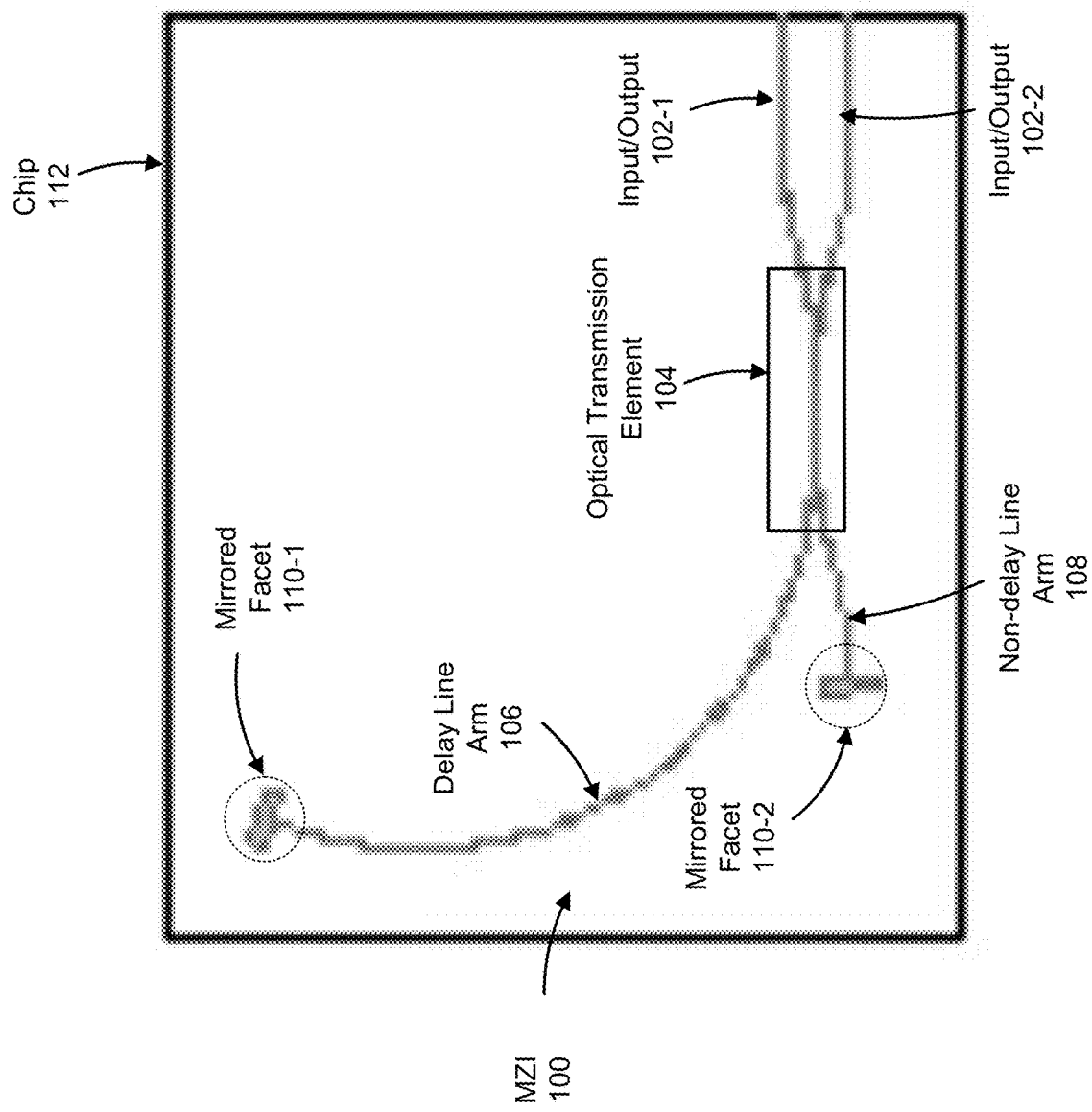
FIG. 1 is a diagram illustrating an example MZI described herein.

The following detailed description of example implementations refers to the accompanying drawings. The same reference numbers in different drawings may identify the same or similar elements.

As described above, a conventional delay line MZI includes a delay line arm and a non-delay line arm, where the delay line arm is longer than the non-delay line arm. A first coupler of the conventional delay line MZI splits an optical signal into a first portion of the optical signal and a second portion of the optical signal, which respectively propagate via the delay line arm and the non-delay line arm to a second coupler, which combines the first portion of the optical signal and the second portion of the optical signal into a combined optical signal. In some cases, such as when the conventional delay line MZI is used for applications involving a switch, an arrayed waveguide, and/or a wavelength locker, among other examples, the delay line arm may have a length of only a few millimeters. However, in other cases, such as when the conventional delay line MZI is used for light detection and ranging (LIDAR) applications, the delay line arm may be several meters long (e.g., greater than one meter). Consequently, in such cases, a footprint of the conventional delay line MZI can be quite large, even when using space saving configurations for the delay line, such as an interleaved spiral configuration (e.g., two interleaved Archimedean spirals connected at the center by an "S-bend" waveguide) for the delay line. Due to the large size of the footprint, the conventional delay line MZI may not be useable in practice for some applications that require a compact design. Furthermore, due to manufacturing limitations, when multiple conventional delay line MZIs are needed for a particular application, each conventional delay line MZI may need to be formed on a different substrate, which increases a complexity associated with manufacturing, assembling, and operating the multiple conventional delay line MZIs. Yet further, conventional delay line MZIs with long delay lines may require undesirable waveguide crossings, which may be avoided in some implementations described herein.

Some implementations described herein provide an MZI that includes a delay line arm and a non-delay line arm, wherein each arm is associated with a mirrored facet. An optical transmission element (e.g., a coupler and/or a splitter, among other examples) of the MZI may be configured to provide a first portion of an optical beam to the delay line arm and a second portion of the optical beam to the non-delay line arm. The delay line arm may be configured to propagate the first portion of the optical beam to a first mirrored facet, which may be configured to reflect a percentage of the first portion of the optical beam to the optical transmission element via the delay line arm. The non-delay line arm may be configured to propagate the second portion of the optical beam to a second mirrored facet, which may be configured to reflect a percentage of the second portion of the optical beam to the optical transmission element via the non-delay line arm. The optical transmission element may be configured to combine the first portion of the optical beam and the second portion of the optical beam to create and provide a combined optical beam for output to another optical element, such as a photodiode.

Accordingly, for an MZI described herein, the delay line arm and the non-delay line arm may have respective optical path lengths that are equal to respective optical path lengths of a delay line arm and non-delay line arm of a conventional delay line MZI. Notably, however, due to the respective mirrored facets associated with the delay line arm and the non-delay line arm of the MZI described herein, the delay line arm and the non-delay line arm have respective lengths that are approximately half the respective lengths of the delay line arm and the non-delay line arm of the conventional delay line MZI. Moreover, because the respective mirrored facets associated with the delay line arm and the non-delay line arm of the MZI described herein reflect portions of the optical beam back to the optical transmission element, the delay line arm and the non-delay line arm do not need to be connected to an additional optical transmission element (e.g., a coupler) to create the combined optical beam. Accordingly, a respective end of the delay line arm and the non-delay line arm (e.g., that terminates with a mirrored facet) is free to be positioned anywhere on a chip of the MZI described herein. This allows for an independent, compact design configuration for each of the delay line arm and the non-delay arm, which is not possible for a conventional delay line MZI that requires the delay line arm and the non-delay line arm to each originate at a first coupler and terminate at a second coupler. Such an independent, compact design configuration may also avoid waveguides crossing over such as may be necessary in long length delay line arms of conventional MZIs.

In this way, a footprint of the MZI described herein is less (e.g., less than one-half the size, less than one-third the size, in some cases) than a footprint of a conventional delay line MZI that provides the same functionality. Accordingly, the MZI described herein can be used for some applications (e.g., some LIDAR applications) where a conventional delay line MZI is not feasible. Moreover, the MZI described herein allows for multiple MZIs to be formed on a single, monolithic substrate (e.g., see FIG. 5) where forming conventional delay line MZIs on a single substrate is not practical (e.g., due to a length of the delay lines associated with the conventional delay line MZIs, because increasing a size of the substrate to accommodate multiple conventional delay line MZI is costly, and/or the like). This reduces a complexity associated with manufacturing, assembling, and operating multiple MZIs described herein as compared to multiple conventional delay line MZIs.

FIG. 1 is a diagram illustrating an example MZI 100 described herein. As shown in FIG. 1, the MZI 100 may include one or more inputs/outputs 102 (shown as input/output 102-1 and input/output 102-2), an optical transmission element 104, a delay line arm 106, a non-delay line arm 108, and one or more mirrored facets 110 (shown as mirrored facet 110-1 and mirrored facet 110-2). As shown in FIG. 1, the MZI 100 may be formed in a chip 112 (e.g., formed on a single, monolithic die). The chip 112 may be a planar lightwave circuit (PLC) chip, a silicon photonics chip, a silicon nitride chip, a silicon oxynitride chip, and/or a III-V semiconductor chip, among other examples (e.g. a die from a wafer or other semi-conductor manufacturing process). As further shown in FIG. 1, the one or more mirrored facets 110 may be positioned at internal locations to the chip 112. In some implementations, the one or more mirrored facets 110 may be positioned at an edge, a border, and/or the like of the chip 112.

In some implementations, the one or more input/outputs 102, the delay line arm 106, and/or the non-delay line arm 108 may each include an optical waveguide (e.g., a glass optical waveguide comprising silicon (Si), silicon dioxide (SiO$_2$), indium phosphide (InP), and/or gallium arsenide (GaAs), among other examples), for receiving and/or transmitting light (e.g., from a light source, such as a laser). The optical transmission element 104 may include a coupler, a splitter, a mixer, and/or a circulator, among other examples, for transmitting light from at least one input/output 102 to the delay line arm 106 and/or the non-delay line arm 108, and/or vice-versa. As shown in FIG. 1, the delay line arm 106 may be positioned in an arc configuration; however, the layout or shape of the delay line arm 106 is unconstrained because the location of the end of delay line arm 106 that terminates at the mirrored facet 110-1 is not restricted (e.g., the mirrored facet 110-1 can be located anywhere that is practical and the layout of delay line arm 106 to reach mirrored facet 110-1 can have any shape, whereas in a conventional delay line MZI, both ends of the delay line arm and the non-delay line arm are constrained by couplers). Moreover, a length of the delay line arm 106 may be greater than a length of the non-delay line arm 108 and, accordingly, an optical path associated with the delay line arm 106 may be greater than an optical path associated with the non-delay line arm 108. A respective mirrored facet 110 may be associated with the delay line arm 106 and/or the non-delay line arm 108. For example, as shown in FIG. 1, the mirrored facet 110-1 may be included as part of, attached to, and/or next to the delay line arm 106 (e.g., at an end of the delay line arm 106) and the mirrored facet 110-2 may be included as part of, attached to, and/or next to the non-delay line arm 108 (e.g., at an end of the non-delay line arm 108).

In some implementations, at least one input/output 102 (e.g., input/output 102-1 and/or input/output 102-2), of the one or more inputs/outputs 102, may be configured to receive and/or propagate an optical beam to the optical transmission element 104. The optical transmission element 104 may be configured to provide a first portion of the optical beam to the delay line arm 106 and a second portion of the optical beam to the non-delay line arm 108.

The delay line arm 106 may be configured to propagate the first portion of the optical beam to the mirrored facet 110-1, which may be configured to reflect a percentage of the first portion of the optical beam and to provide the percentage of the first portion of the optical beam to the delay line arm 106. The delay line arm 106 may be configured to propagate the percentage of the first portion of the optical beam to the optical transmission element 104. The non-delay line arm 108 may be configured to propagate the second portion of the optical beam to the mirrored facet 110-2, which may be configured to reflect a percentage of the second portion of the optical beam and to provide the percentage of the second portion of the optical beam to the non-delay line arm 108. The non-delay line arm 108 may be configured to propagate the percentage of the second portion of the optical beam to the optical transmission element 104.

The optical transmission element 104 may be configured to receive the percentage of the first portion of the optical beam (e.g., from the delay line arm 106) and the percentage of the second portion of the optical beam (e.g., from the non-delay line arm 108), to combine (e.g., mix or interfere) the percentage of the first portion of the optical beam and the percentage of the second portion of the optical beam to create a combined optical beam, and to provide portions of the combined optical beam to the input/outputs 102 (e.g., input/output 102-1 and/or input/output 102-2). The at least one input/output 102 may be configured to receive and/or propagate the combined optical beam external from the MZI 100 (e.g. to another optical element, such as a photodiode (not shown in FIG. 1)).

The number and arrangement of components shown in FIG. 1 are provided as an example. In practice, there may be additional components, fewer components, different components, differently arranged components, or differently connected components than those shown in FIG. 1. Furthermore, two or more components in FIG. 1 may be implemented within a single component, or a single component shown in FIG. 1 may be implemented as multiple, distributed components. Additionally, or alternatively, a set of components (e.g., one or more components) of FIG. 1 may perform one or more functions described as being performed by another set of components of FIG. 1.

Figure 2:
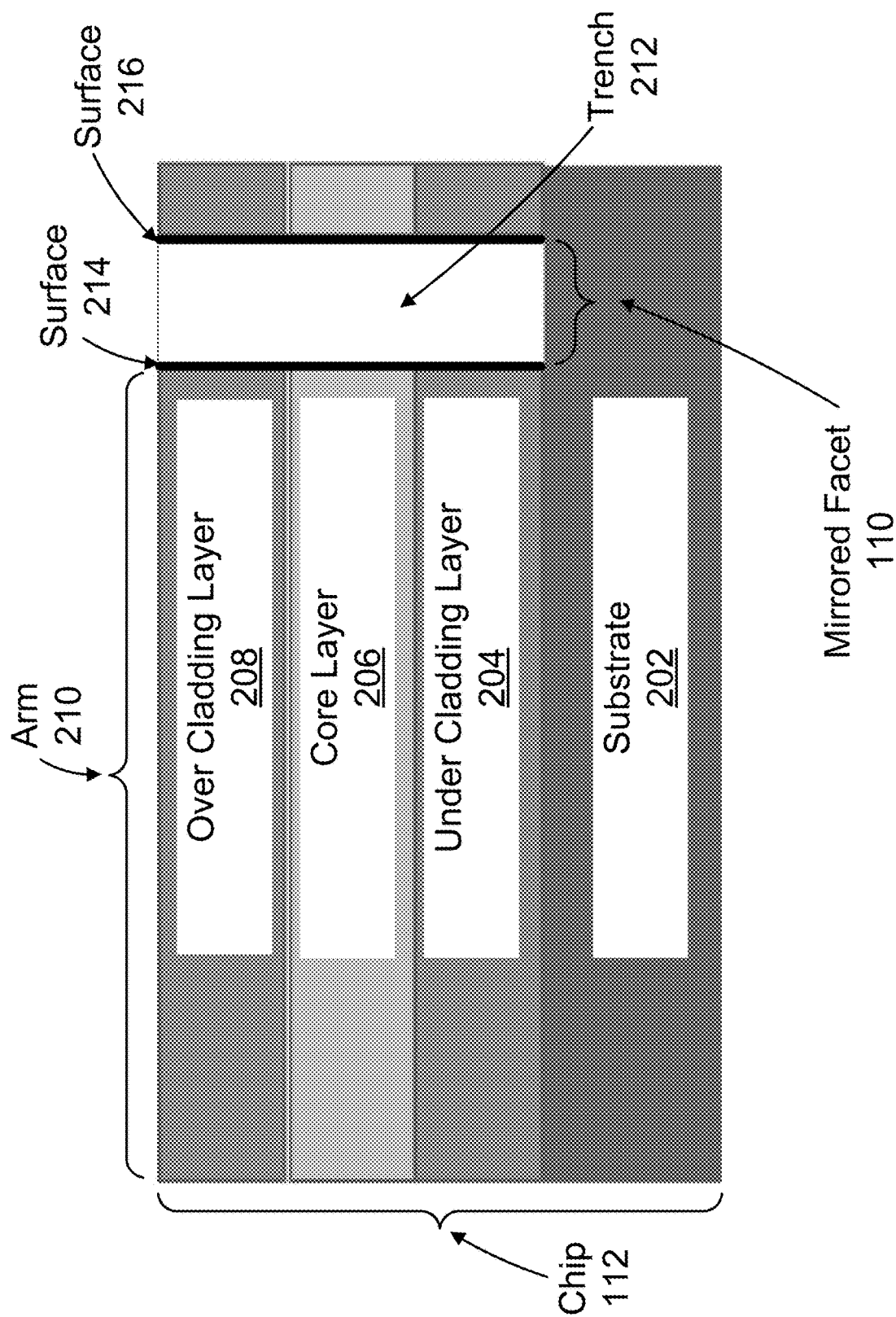
FIG. 2 is a diagram illustrating a cross-section of a portion of the example MZI of FIG. 1.

FIG. 2 is a diagram illustrating a cross-section of a portion of example MZI 100 of FIG. 1. The cross-section of FIG. 2 passes longitudinally through a portion of an arm 210 (e.g. delay line arm 106 or non-delay line arm 108) and a mirrored facet 110 of the chip 112. The chip 112 may comprise one or more layers, such as a substrate 202, an under cladding layer 204 (e.g., formed over the substrate 202), a core layer 206 (e.g., formed over the under cladding layer 204), and/or an over cladding layer 208 (e.g., formed over the core layer 206). For example, as shown in FIG. 2, the over cladding layer 208 may be disposed over the core layer 206, which may be disposed over the under cladding layer 204, which may be disposed over the substrate 202. The over cladding layer 208 and the under cladding layer 204 may confine light within the core layer 206 (e.g., when the light is transmitted via the arm 210). This may be referred to as vertical light confinement. In some implementations, the arm 210 may be a ridge of the core layer 206 that is surrounded by cladding (e.g. by the over cladding layer 208) or may be described as the core layer 206, where adjacent regions of the core layer 206 are doped or otherwise modified (e.g., to change a refractive index of the adjacent regions) to cause light to be horizontally confined within the waveguide. Other layer constructions for the chip 112, the arm 202, or other waveguiding structures are equally possible.

As further shown in FIG. 2, the mirrored facet 110 may include a trench 212 (shown in FIG. 2 as a vertical trench). In some implementations, the trench 212 may be formed (e.g., etched) in the core layer 206, the over cladding layer 208, and at least some of the under cladding layer 204 of the chip 112. For example, as shown in FIG. 2, the trench 212 may be formed in the under cladding layer 204, the core layer 206, and the over cladding layer 208. In some implementations, the trench 212 may also be formed in at least some of the substrate 202. Accordingly, the mirrored facet 110 may be an etched facet. In some implementations, the trench 212 may be formed as a dicing trench at an edge of the chip 112 although additional processing steps, such as polishing, may be desired.

In some implementations, the trench 212 is configured to allow the mirrored facet 110 to reflect a particular percentage of light at surface 214. In some implementations, the surface 214 may reflect light due to Fresnel's law. For example, due to a glass-to-gas transition (e.g., a glass-to-air transition in a non-hermetically sealed mirrored facet 110 or a glass-to-nitrogen transition in a nitrogen purged, hermetically sealed mirrored facet 110, among other examples) between the arm 210 and the trench 212, the surface 214 may reflect approximately 4% of light (e.g., 4% of light within a tolerance, such as ±0.5%), or approximately a 14 decibel (dB) loss, at the mirrored facet 110 (e.g., to the arm 210). Different percentage amounts of reflection are possible based on the trench 212, the surface 214 and/or the materials involved in the glass-to-gas transition.

In some implementations, the trench 212 may be metallized (e.g., to improve an amount of reflectance at surface 214). For example, after the trench 212 is formed, a metal layer (e.g., comprising aluminum (Al), copper (Cu), gold (Au), silver (Ag), and/or the like) may be formed (e.g., grown, deposited, and/or the like) on surface 214 (e.g., a "front" surface of the trench 212) and/or one or more other surfaces of the trench 212. A thickness of the metal layer may be sufficiently thick (e.g., the thickness of the metal layer may satisfy a thickness threshold, such as a 0.1 micron thickness threshold) to cause the surface 214 to reflect approximately 90% of light (e.g., 90% of light within a tolerance, such as ±3%) that reaches the mirrored facet 110 (e.g., via the arm 210) and thereby cause the trench 212 to reflect approximately 90% of light (e.g., to the arm 210). Different percentage amounts of reflection are possible based on the type of metal layer and/or the thickness of the metal layer.

Additionally, or alternatively, an edge, a border, a side, and/or the like of the chip 112 of the MZI 100 may be polished and/or metallized to form the mirrored facet 110. An arm of the MZI 100 (e.g., the delay line arm 106, and/or the non-delay line arm 108) may be attached to and/or connected to the edge, the border, the side, and/or the like of the chip. The mirrored facet 110 may therefore reflect a particular percentage of light (e.g., 90% of light within a tolerance, such as ±3%) that reaches the mirrored facet 110 (e.g., via the arm).

The number and arrangement of components shown in FIG. 2 are provided as an example. In practice, there may be additional components, fewer components, different components, differently arranged components, or differently connected components than those shown in FIG. 2. Furthermore, two or more components in FIG. 2 may be implemented within a single component, or a single component shown in FIG. 2 may be implemented as multiple, distributed components. Additionally, or alternatively, a set of components (e.g., one or more components) of FIG. 2 may perform one or more functions described as being performed by another set of components of FIG. 2.

Figure 3:
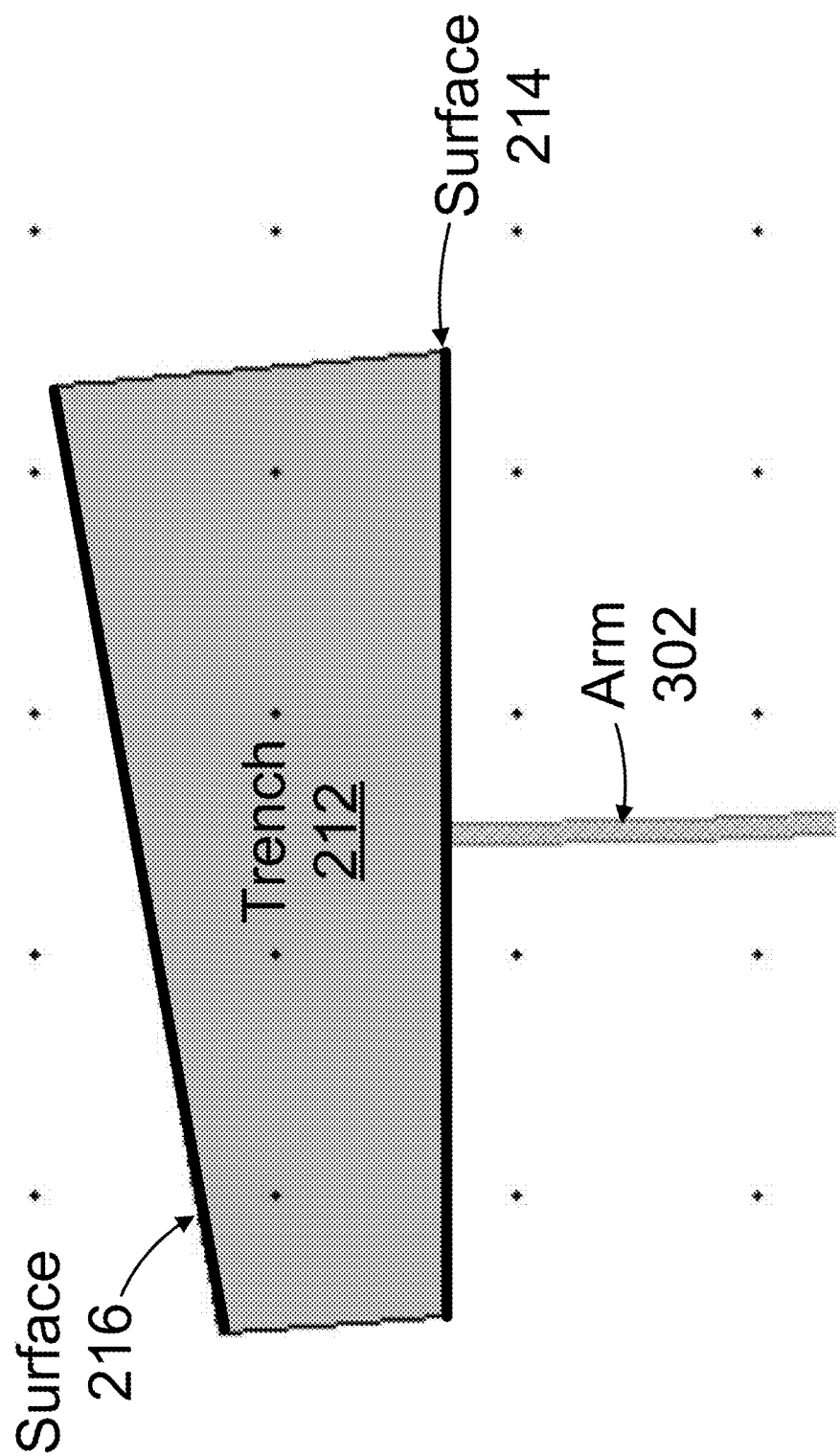
FIG. 3 is a diagram illustrating a top view of an example trench of a mirrored facet described herein.

FIG. 3 is a diagram illustrating a top view of an example trench 212 of the mirrored facet 110 described herein (e.g., when the trench 212 is not metallized). As shown in FIG. 3, an arm 302 (e.g., the delay line arm 106 or the non-delay line arm 108) may be connected to the trench 212 to allow light to reflect back into the arm 302 at surface 214. As further shown in FIG. 3, the surface 216 of the trench 212 (e.g., the "back" surface of the trench 212) may be angled (e.g., as compared to the "front" surface 214 of the trench 212 that is perpendicular to the arm 302) to prevent and/or mitigate light that passes through the trench 212 from reflecting from the surface 216 and coupling back into the arm 302. Moreover, this prevents and/or mitigates light reflected at the surface 216 from interfering with light that is reflected at the surface 214 due to Fresnel reflection (e.g., as described above).

The number and arrangement of components shown in FIG. 3 are provided as an example. In practice, there may be additional components, fewer components, different components, differently arranged components, or differently connected components than those shown in FIG. 3. Furthermore, two or more components in FIG. 3 may be implemented within a single component, or a single component shown in FIG. 3 may be implemented as multiple, distributed components. Additionally, or alternatively, a set of components (e.g., one or more components) of FIG. 3 may perform one or more functions described as being performed by another set of components of FIG. 3.

Figure 4:
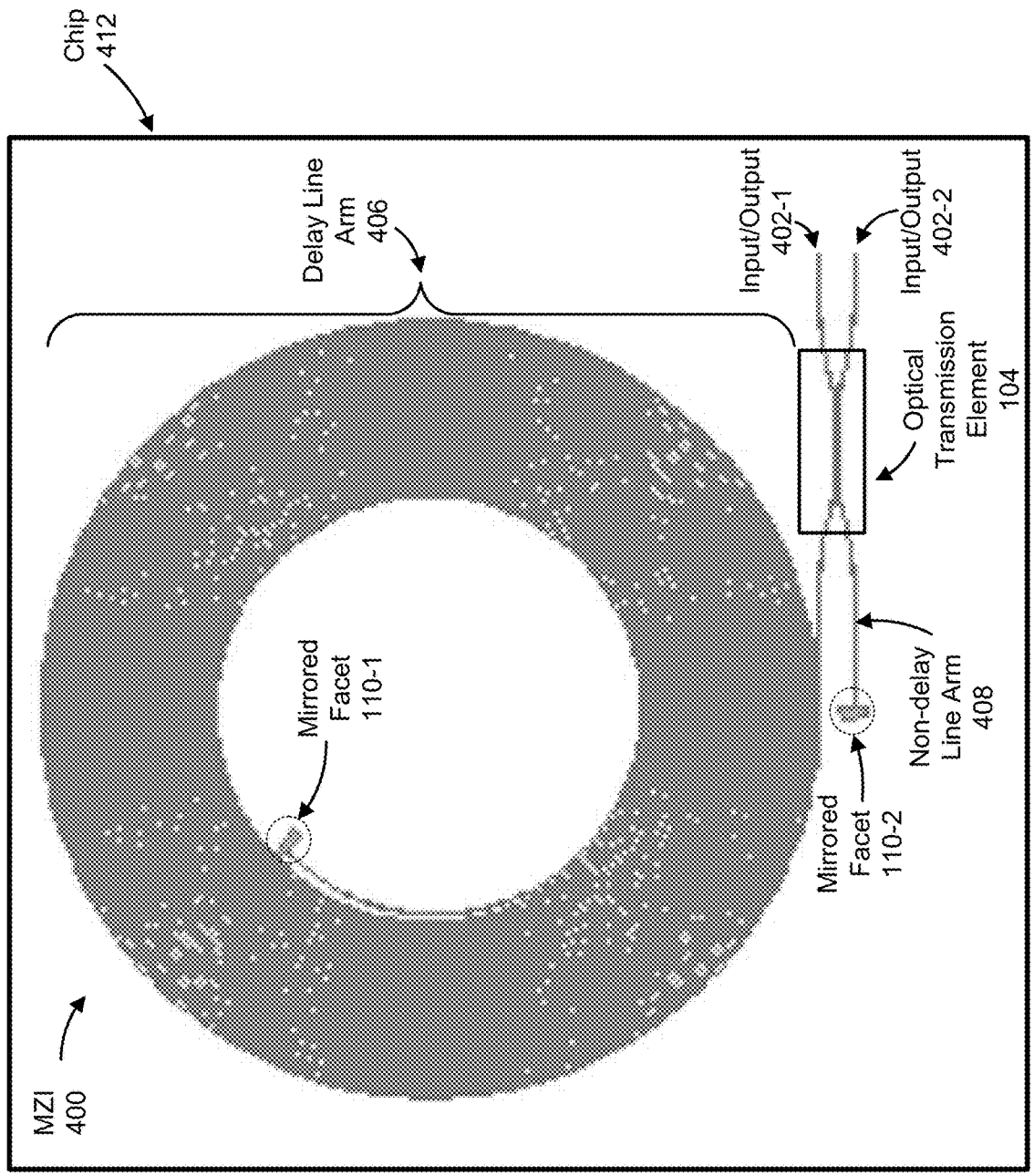
FIG. 4 is a diagram illustrating an example MZI described herein.

FIG. 4 is a diagram illustrating an example MZI 400 described herein. As shown in FIG. 4, the MZI 400 may include one or more inputs/outputs 402 (shown as input/output 402-1 and input/output 402-2), an optical transmission element 104, a delay line arm 406, and a non-delay line arm 408, and one or more mirrored facets 110 (shown as mirrored facet 110-1 and mirrored facet 110-2). As shown in FIG. 4, the MZI 400 may be formed in a chip 412 (e.g., formed on a single, monolithic die). The chip 412 may be a PLC chip, a silicon photonics chip, a silicon nitride chip, a silicon oxynitride chip, and/or a III-V semiconductor chip, among other examples. As further shown in FIG. 4, the one or more mirrored facets 110 may be positioned at internal locations of the chip 412.

In some implementations, the one or more inputs/outputs 402, the delay line arm 406, and/or the non-delay line arm 408 may each include an optical waveguide (e.g., a glass optical waveguide comprising Si, $SiO_2$, InP, and/or GaAs, among other examples), for receiving and/or transmitting light (e.g., from a light source, such as a laser, or to a receiver, such as a photodetector). As described above, the optical transmission element 104 may include a coupler, a splitter, a mixer, and/or a circulator, among other examples, for transmitting light from at least one input/output 402 to the delay line arm 406 and/or the non-delay line arm 408, and/or vice-versa. As shown in FIG. 4, the delay line arm 406 may be positioned in a spiral configuration (e.g., the delay line arm 406 is wound one or more times around a central point in a single spiral configuration, such as an Archimedean spiral configuration). By positioning the delay line arm 406 in a spiral configuration, the delay arm 406 has a compact design (e.g. reduced size or footprint compared to prior delay line interferometers). By positioning the delay line arm 406 in a spiral configuration, the mirrored facet 110-1 is located internally to the spiral configuration, away from an edge of the MZI 400, or away from an edge of a die comprising the MZI 400. Positioning the delay line arm in a spiral configuration that does not cross over other waveguides is possible in part because the end of the delay line arm 406 terminating at the mirrored facet 110-1 does not need to reconnect with the end of the non-delay line arm 408 terminating at the mirrored facet 110-2. This relaxed design constraint for the MZI 400, enables a more compact layout for delay line arm 406 without crossing over other waveguides than is possible in conventional delay line MZIs. Moreover, a length of the delay line arm 406 may be greater than a length of the non-delay line arm 408 and, accordingly, an optical path associated with the delay line arm 406 may be greater than an optical path associated with the non-delay line arm 408. A respective mirrored facet 110 may be associated with the delay line arm 406 and/or the non-delay line arm 408. For example, as shown in FIG. 4, the mirrored facet 110-1 may be included as part of, attached to, and/or next to the delay line arm 406 (e.g., wherein the mirrored facet is within the spiral configuration of the delay line arm 406) and the mirrored facet 110-2 may be included as part of, attached to, and/or next to the non-delay line arm 408 (e.g., at an end of the non-delay line arm 408).

In some implementations, at least one input/output 402 (e.g., input/output 402-1 and/or input/output 402-2), of the one or more inputs/outputs 402, may be configured to receive and/or propagate an optical beam to the optical transmission element 104. The optical transmission element 104 may be configured to provide a first portion of the optical beam to the delay line arm 406 and a second portion of the optical beam to the non-delay line arm 408.

The delay line arm 406 may be configured to propagate the first portion of the optical beam to the mirrored facet 110-1, which, in a similar manner as that described above, may be configured to reflect a percentage of the first portion of the optical beam and to provide the percentage of the first portion of the optical beam to the delay line arm 406. The delay line arm 406 may be configured to propagate the percentage of the first portion of the optical beam to the optical transmission element 104. The non-delay line arm 408 may be configured to propagate the second portion of the optical beam to the mirrored facet 110-2, which, in a similar manner as that described above, may be configured to reflect a percentage of the second portion of the optical beam and to provide the percentage of the second portion of the optical beam to the non-delay line arm 408. The non-delay line arm 408 may be configured to propagate the percentage of the second portion of the optical beam to the optical transmission element 104.

The optical transmission element 104, in a similar manner as that described above, may be configured to receive the percentage of the first portion of the optical beam (e.g., from the delay line arm 406) and the percentage of the second portion of the optical beam (e.g., from the non-delay line arm 408), to combine (e.g., mix or interfere) the percentage of the first portion of the optical beam and the percentage of the second portion of the optical beam to create a combined optical beam, and to provide portions of the combined optical beam to the input/output 402 (e.g., input/output 402-1 and/or input/output 402-2). The at least one input/output 402 may be configured to receive and/or propagate the combined optical beam to another optical element, such as a photodiode (not shown in FIG. 4).

Additionally, or alternatively, a splitter (not shown in FIG. 4), such as a power balancing splitter, may be associated with the non-delay arm 408. The splitter may be configured to reduce the power (e.g. optical power) of the light returning to the optical transmission element 104 from the non-delay line arm 408 so that that power is in balance (e.g. equal within a tolerance) with the power (e.g. optical power) of the light returning to the optical element 104 from the delay line arm 406.

The number and arrangement of components shown in FIG. 4 are provided as an example. In practice, there may be additional components, fewer components, different components, differently arranged components, or differently connected components than those shown in FIG. 4. Furthermore, two or more components in FIG. 4 may be implemented within a single component, or a single component shown in FIG. 4 may be implemented as multiple, distributed components. Additionally, or alternatively, a set of components (e.g., one or more components) of FIG. 4 may perform one or more functions described as being performed by another set of components of FIG. 4.

Figure 5:
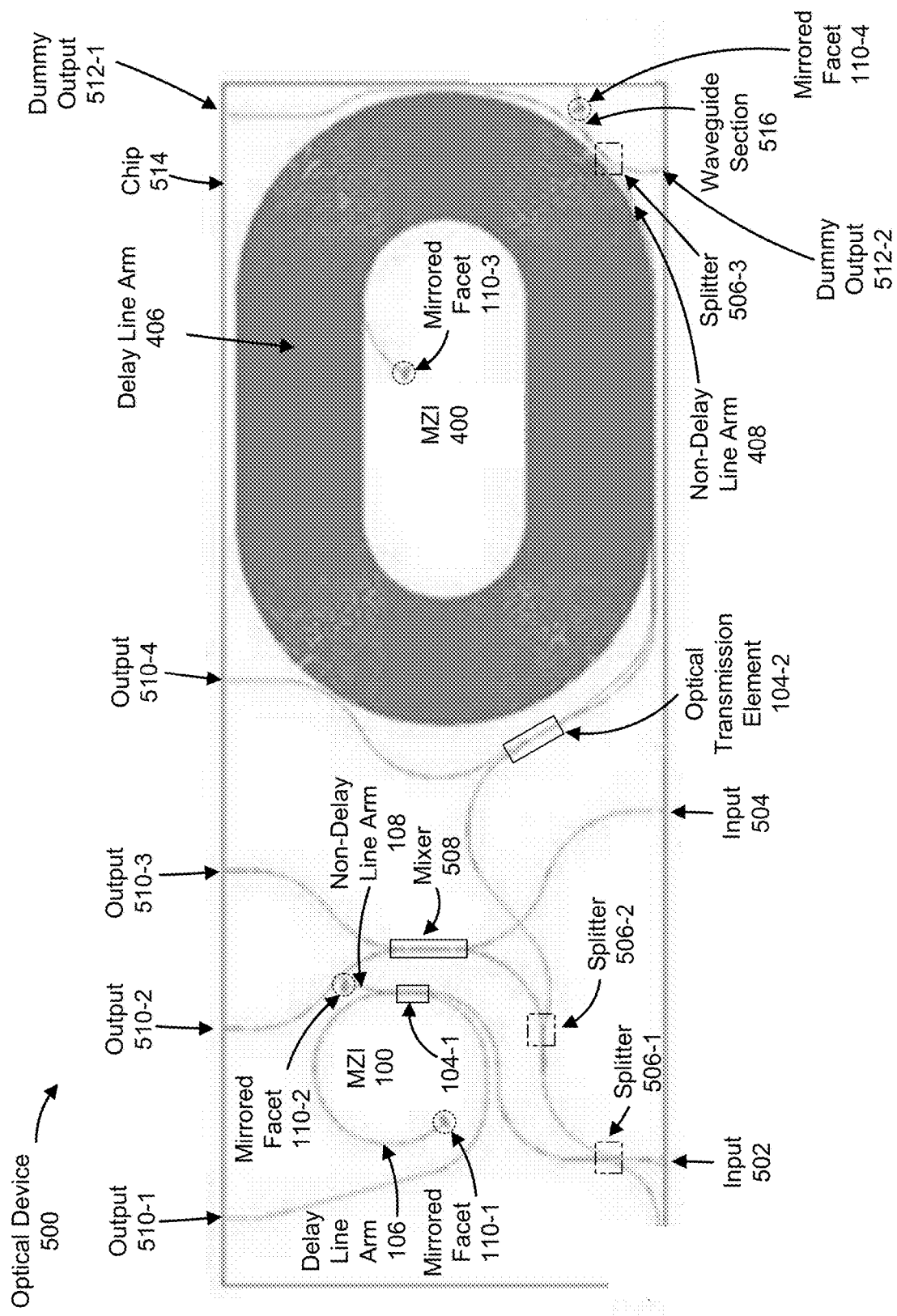
FIG. 5 is a diagram illustrating an example optical device described herein.

FIG. 5 is a diagram illustrating an example optical device 500 described herein. As shown in FIG. 5, the optical device may include an input 502 to receive an optical beam (e.g., from a laser); an input 504 to receive an optical signal; one or more splitters 506 (shown as splitters 506-1 through splitter 506-3); a mixer 508; an MZI 100 that includes an optical transmission element 104-1, a delay line arm 106, a non-delay line arm 108, and one or more mirrored facets 110 (shown as mirrored facet 110-1 and mirrored facet 110-2); an MZI 400 that includes an optical transmission element 104-2, a delay line arm 406, a non-delay line arm 408 (that includes a power balancing splitter 506-3, a waveguide section 516, a dummy output 512-1, and/or a dummy output 512-2), and one or more mirrored facets 110 (shown as mirrored facet 110-3 and mirrored facet 110-4); and/or one or more outputs 510 (shown as outputs 510-1 through 510-4). As shown in FIG. 5, the optical device 500 may be formed on a chip 514. As further shown in FIG. 5, the one or more mirrored facets 110 may be positioned at internal locations on the chip 514.

In some implementations, the input 502 may be configured to receive and/or propagate an optical beam (e.g., from a light source, such as a laser) to the splitter 506-1. The splitter 506-1 may be configured to split the optical beam into a first optical beam part and a second optical beam part. In some implementations, the splitter 506-1 may be configured to provide the first optical beam part to the MZI 100 (e.g., to the optical transmission element 104-1 of the MZI 100) and the second optical beam part to the splitter 506-2.

In some implementations, the optical transmission element 104-1 of the MZI 100 may be configured to provide a first portion of the first optical beam part to the delay line arm 106 and a second portion of the first optical beam part to the non-delay line arm 108. The delay line arm 106 may be configured to propagate the first portion of the first optical beam part to the mirrored facet 110-1, which may be configured to reflect a percentage of the first portion of the first optical beam part and to provide the percentage of the first portion of the first optical beam part to the delay line arm 106. The non-delay line arm 108 may be configured to propagate the second portion of the first optical beam part to the mirrored facet 110-2, which may be configured to reflect a percentage of the second portion of the first optical beam part and to provide the percentage of the second portion of the first optical beam part to the non-delay line arm 108.

The delay line arm 106 may be configured to propagate the percentage of the first portion of the first optical beam part to the optical transmission element 104-1. The non-delay line arm 108 may be configured to propagate the percentage of the second portion of the first optical beam part to the optical transmission element 104-1.

The optical transmission element 104-1 may be configured to receive the percentage of the first portion of the first optical beam part (e.g., from the delay line arm 106) and the percentage of the second portion of the first optical beam part (e.g., from the non-delay line arm 108), to combine (e.g., mix or interfere) the percentage of the first portion of the first optical beam part and the percentage of the second portion of the first optical beam part to create a first combined optical beam, and to provide portions of the first combined optical beam to the output 510-1. The first combined optical beam may be received, via the output 510-1, and used as, for example, a control signal for wavelength locking.

The splitter 506-2 may be configured to receive the second optical beam part (e.g., from the splitter 506-1) and to split the second optical beam part into a third optical beam part and a fourth optical beam part. In some implementations, the splitter 506-2 may be configured to provide the third optical beam part to the mixer 508 and the fourth optical beam part to the MZI 400 (e.g., to the optical transmission element 104-2 of the MZI 400). In some implementations splitter 506-1 and splitter 506-2 may be combined into a single splitter (e.g. using a 1×3 splitter or a 1×4 splitter) instead of being discrete elements as illustrated in FIG. 5.

In some implementations, the input 504 may be configured to receive and/or propagate an optical signal (e.g., from an optical information source) to the mixer 508. In some implementations, the mixer 508 may be configured to combine (e.g., mix or interfere) the third optical beam part and the optical signal to create a first combined optical signal and a second combined optical signal. The mixer 508 may be configured to provide portions of the first combined optical signal to the output 510-2 and/or portions of the second combined optical signal to the output 510-3. The output 510-2 may be configured to receive and/or propagate the portions of the first combined optical signal to another optical element, such as a photodiode. The output 510-3 may be configured to receive and/or propagate the portions of the second combined optical signal to another optical element, such as a photodiode.

In some implementations, the optical transmission element 104-2 of the MZI 400 may be configured to split the fourth optical beam part into a first portion of the fourth optical beam part and a second portion of the fourth optical beam part. The optical transmission element 104-2 may be configured to provide the first portion of the fourth optical beam part to the delay line arm 406 and the second portion of the fourth optical beam part to the non-delay line arm 408. The delay line arm 406 may be configured to propagate the first portion of the fourth optical beam part to the mirrored facet 110-3, which may be configured to reflect a percentage of the first portion of the fourth optical beam part and to provide the percentage of the first portion of the fourth optical beam part to the delay line arm 406.

The non-delay line arm 408 may include a splitter 506-3 (e.g., a power balancing splitter) that connects to the optical transmission element 104-2, a waveguide section 516 that connects between the splitter 506-3 and the mirrored facet 110-4 and two additional waveguides that connect to dummy output 512-1 and dummy output 512-2, respectively. Splitter 506-3 may be configured to split the second portion of the fourth optical beam part into a first subpart of the second portion of the fourth optical beam part (hereinafter referred to as the "first optical beam subpart") and a second subpart of the second portion of the fourth optical beam part (hereinafter referred to as the "second optical beam subpart"). The splitter 506-3 may be configured to provide the first optical beam subpart to the waveguide section 516. The waveguide section 516 may be configured to propagate the first optical beam subpart to the mirrored facet 110-4, which may be configured to reflect a percentage of the first optical beam subpart and to provide the percentage of the first optical beam subpart to the waveguide section 516. The splitter 506-3 may be configured to provide the second optical beam subpart to a dummy output 512-1. In this way, the splitter 506-3 may be configured to reduce an amount of power (e.g., an optical power) of the first optical beam subpart that is provided to the waveguide section 516 (by directing a particular amount of power associated with the second optical beam subpart to the dummy output 512-1).

The delay line arm 406 may be configured to propagate the percentage of the first portion of the fourth optical beam part to the optical transmission element 104-2. The waveguide section 516 may be configured to propagate the percentage of the first optical beam subpart to the splitter 506-3, which may be configured to split the percentage of the first optical beam subpart into a first percentage of the first optical beam subpart and a second percentage of the first optical beam subpart. The splitter 506-3 may be configured to provide the first percentage of the first optical beam subpart to the optical transmission element 104-2 and the second percentage of the first optical beam subpart to the dummy output 512-2. In this way, the splitter 506-3 may be configured to facilitate balancing of a power (e.g., an optical power) of the percentage of the first portion of the fourth optical beam part and a power (e.g., an optical power) of the first percentage of the first optical beam subpart (e.g., such that the reflected amounts of light from the delay line arm 406 and from the non-delay line arm 408, as described herein, are equal, within a tolerance, when entering the optical transmission element 104-2).

The optical transmission element 104-2 may be configured to receive the percentage of the first portion of the fourth optical beam part (e.g., from the delay line arm 406) and the first percentage of the first optical beam subpart (e.g., from the non-delay line arm 408 and the splitter 506-3), to combine (e.g., mix or interfere) the percentage of the first portion of the fourth optical beam part and the first percentage of the first optical beam subpart part to create a second combined optical beam, and to provide a portion of the second combined optical beam to the output 510-4. The output 510-4 may be configured to receive and/or propagate the portion of the second combined optical beam to another optical element, such as a photodiode, and/or an optical transmission system, such as an optical frequency discriminator, among other examples.

In some implementations, such as for LIDAR applications, the MZI 400 may form an optical frequency discriminator where optical power modulation is required in much smaller wavelength difference in FMCW LIDAR (Frequency Modulated Continuous Wave LIght Detection And Ranging). Light from output 510-4 may be converted to an electrical signal and may be used to evaluate location and/or velocity information of an object. The object may be scanned by light from output 510-2 and/or output 510-3.

The number and arrangement of components shown in FIG. 5 are provided as an example. In practice, there may be additional components, fewer components, different components, differently arranged components, or differently connected components than those shown in FIG. 5. Furthermore, two or more components in FIG. 5 may be implemented within a single component, or a single component shown in FIG. 5 may be implemented as multiple, distributed components. Additionally, or alternatively, a set of components (e.g., one or more components) of FIG. 5 may perform one or more functions described as being performed by another set of components of FIG. 5.

Figure 6A:
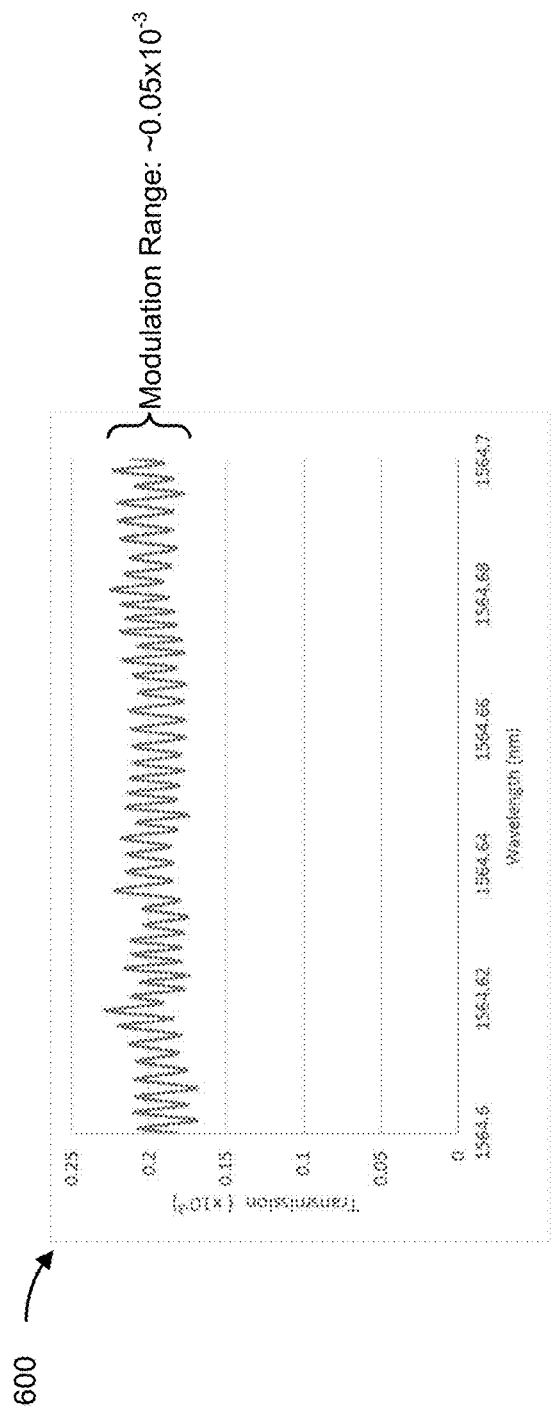
FIGS. 6A-6C depict example charts showing a relationship between wavelength and optical transmission through particular MZIs described herein.
Figure 6B:
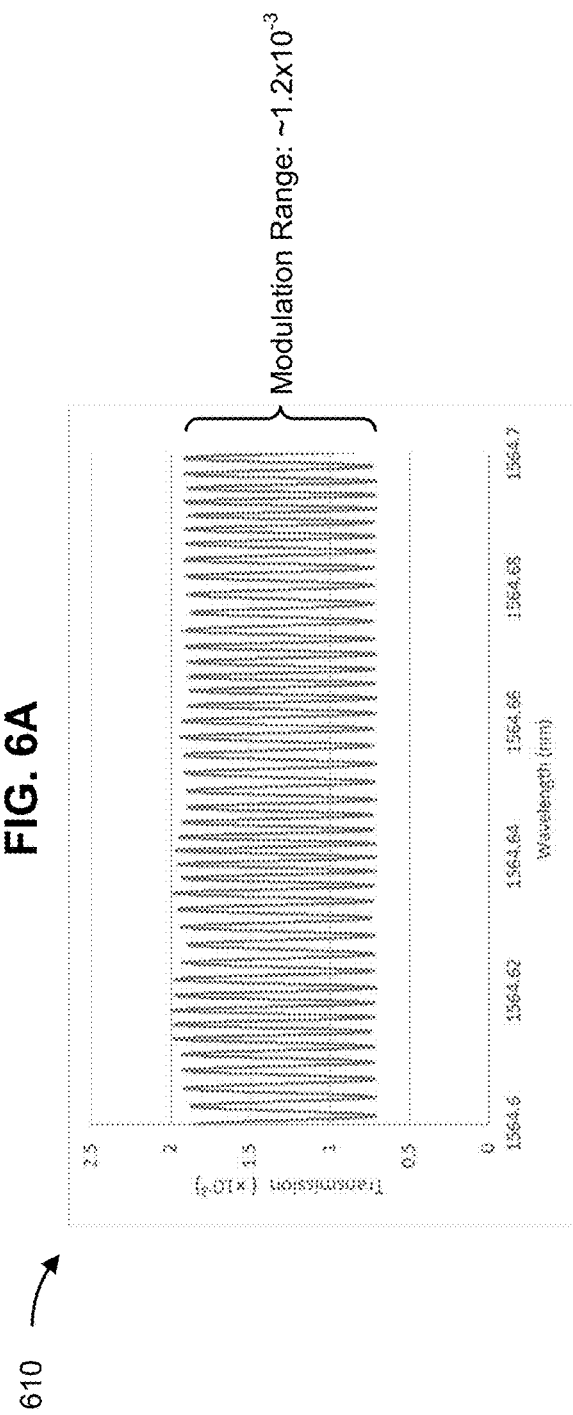
Figure 6C:
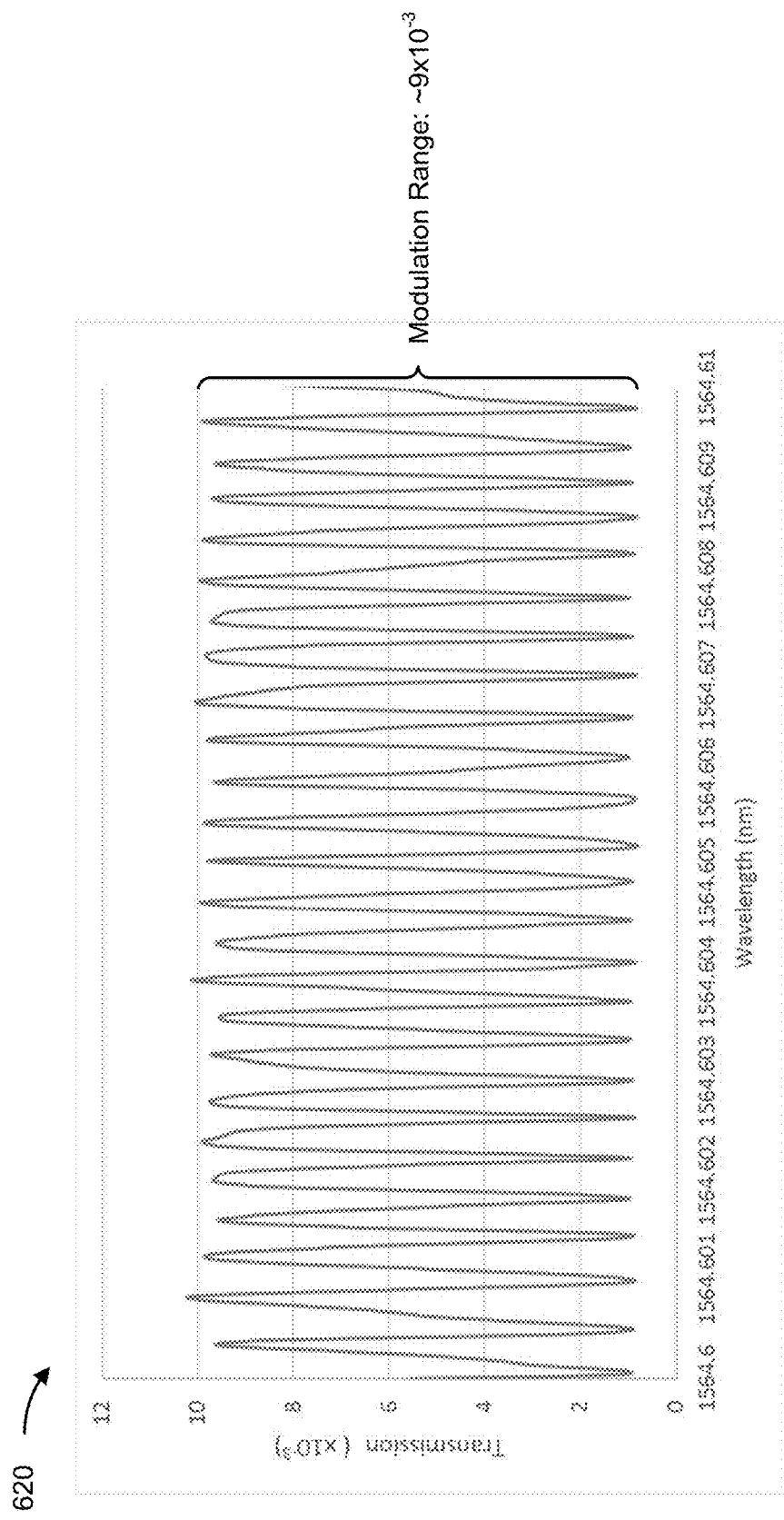

FIGS. 6A-6C depict example charts 600, 610, and 620 showing relationships between wavelength and optical transmission through particular MZIs described herein. As shown in FIG. 6A and chart 600, a first particular MZI with non-metallized mirrored facets associated with a delay line arm and a non-delay line arm (e.g., where the delay line arm is approximately one meter (m) long and the delay line has approximately a 7 dB greater insertion loss than the non-delay line arm) has a modulation range of approximately $0.05 \times 10^{-3}$ for wavelengths between 1564.6 and 1564.7 nanometers (nm). As shown in FIG. 6B and chart 610, a second particular MZI that includes a metallized mirrored facet (e.g., comprising an aluminum copper (AlCu) metal layer) associated with a delay line arm (e.g., where the delay line arm is approximately 1 m long and the delay line has approximately a 7 dB greater insertion loss than a non-delay line arm) and a non-metallized mirrored facet associated with the non-delay line arm has a modulation range of approximately $1.2 \times 10^{-3}$ for wavelengths between 1564.6 and 1564.7 nm. As shown in FIG. 6C and chart 620, a third particular MZI that includes a metallized mirrored facet (e.g., comprising an AlCu metal layer) associated with a delay line arm (e.g., where the delay line arm is approximately 6 m long and the delay line has approximately a 9 dB greater insertion loss than a non-delay line arm) and a non-metallized mirrored facet associated with a non-delay line arm has a modulation range of approximately $9 \times 10^{-3}$ for wavelengths between 1564.4 and 1564.61 nm.

As indicated above, FIGS. 6A-6C depict one or more examples. Other examples may differ from what is described with regard to FIGS. 6A-6C.

Figure 7B:
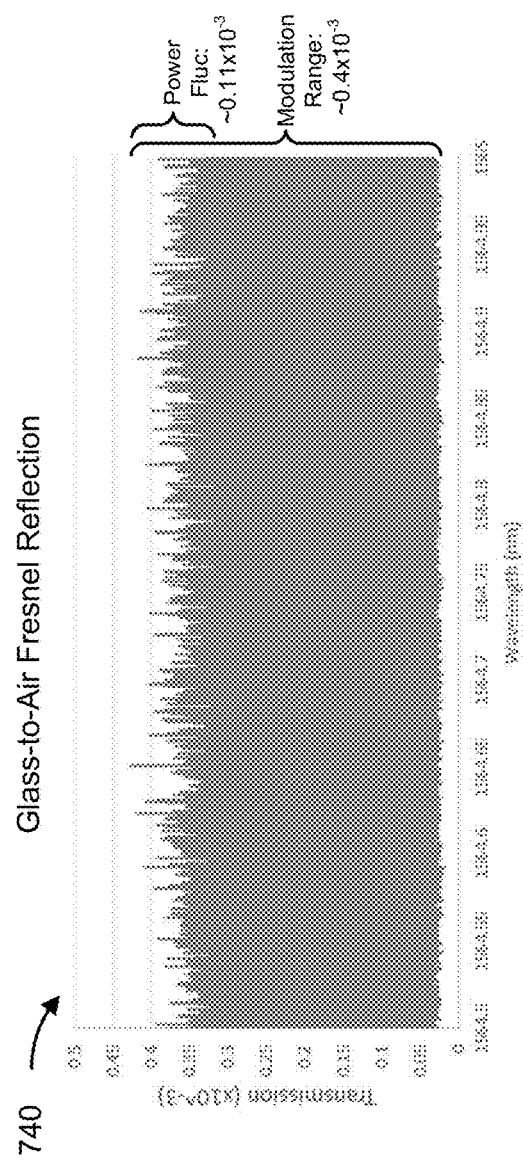
FIGS. 7A-7D depict an example optical device described herein and associated charts.
Figure 7C:
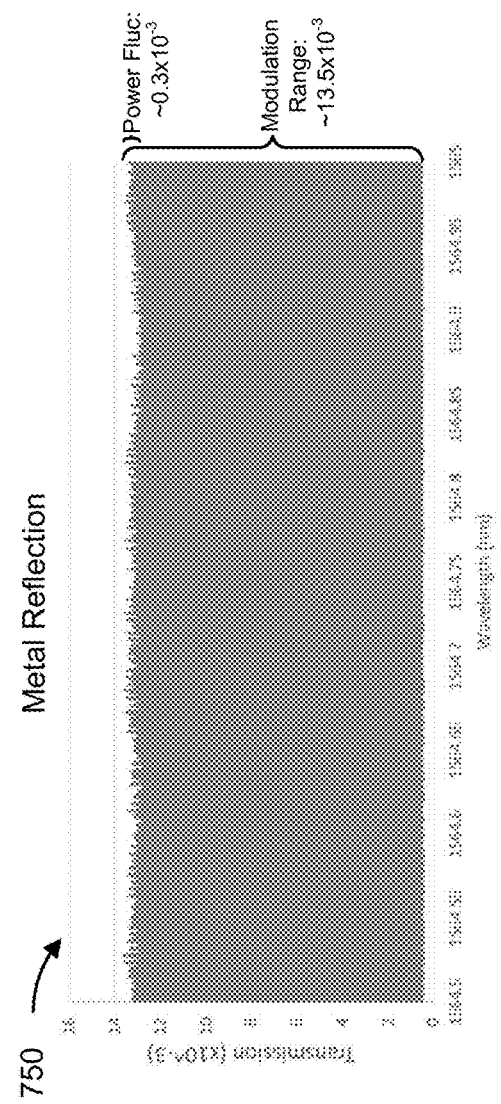
Figure 7A:
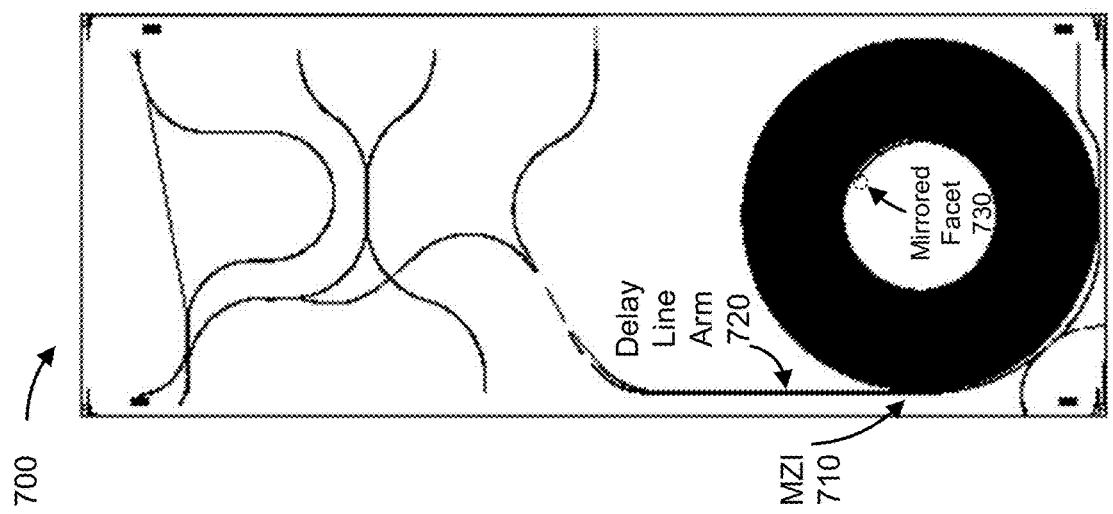

FIGS. 7A-7D depict an example optical device 700 described herein and associated charts. As shown in FIG. 7A, the optical device 700 may include an MZI 710 that includes a delay line arm 720 with a mirrored facet 730 at the end of the delay line arm 720. The delay line arm 720 may be positioned in a spiral configuration with the mirrored facet 730 positioned within the spiral configuration. The delay line arm 720 may have a length of approximately 2.9 m (and a total optical length for light propagating through the MZI 710 via the delay line arm 720 may be approximately 4.2 m). The delay line arm 720 may have 94 loops in the spiral configuration (e.g., around a center point of the spiral configuration) and may have a pitch (e.g., a distance between two loops of the delay line arm 720 in the spiral configuration) of 20 micrometers (μm).

As shown in FIG. 7B and chart 740, when the mirrored facet 730 is non-metallized (e.g., light is reflected by the mirrored facet via Fresnel reflection, such as due to a glass-to-gas transition), the MZI 710 has a modulation range of approximately $0.4 \times 10^{-3}$ and a power fluctuation of approximately $0.11 \times 10^{-3}$ for wavelengths between 1564.5 and 1565 nm. As shown in FIG. 7C and chart 750, when the mirrored facet 730 is metallized (e.g., light is reflected by the mirrored facet via a metal layer formed on the mirrored facet), the MZI 710 has a modulation range of approximately $13.5 \times 10^{-3}$ and a power fluctuation of approximately $0.3 \times 10^{-3}$ for wavelengths between 1564.5 and 1565 nm. Accordingly, in this case, the power fluctuation compared to the modulation range when the mirrored facet 730 is metallized $$\left(\text{e.g., } \frac{0.3 \times 10^{-3}}{13.5 \times 10^{-3}} = 0.022\right)$$

is less than when the mirrored facet is non-metallized $$\left(\text{e.g., } \frac{0.11 \times 10^{-3}}{0.4 \times 10^{-3}} = 0.275\right).$$

Figure 7D:
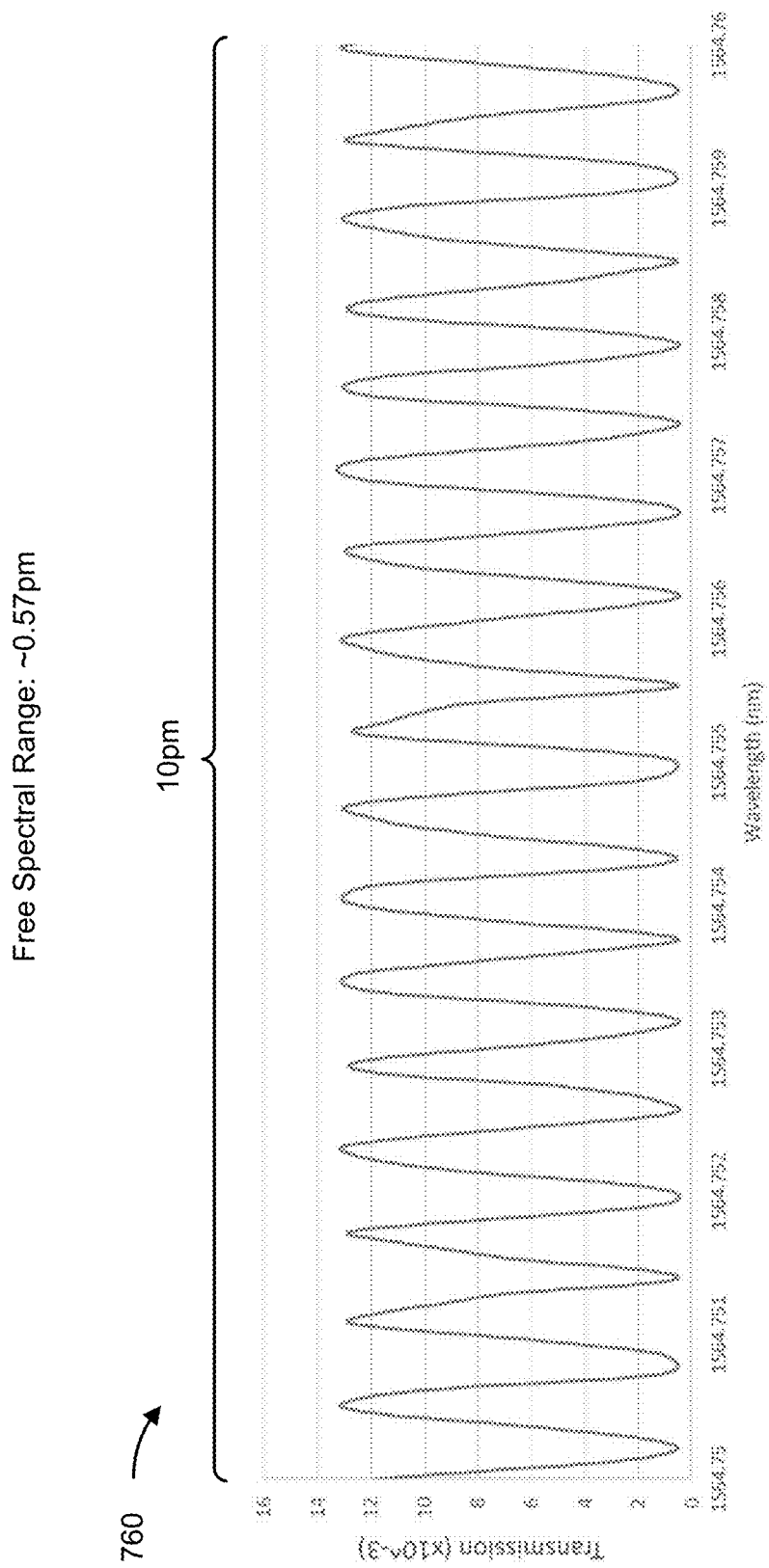

As shown in FIG. 7D and chart 760, the MZI 710 has a free spectral range of approximately 0.57 picometers (pm) regardless of whether the mirrored facet 730 is non-metallized or metallized.

As indicated above, FIGS. 7A-7D depict one or more examples. Other examples may differ from what is described with regard to FIGS. 7A-7D.

Figure 8B:
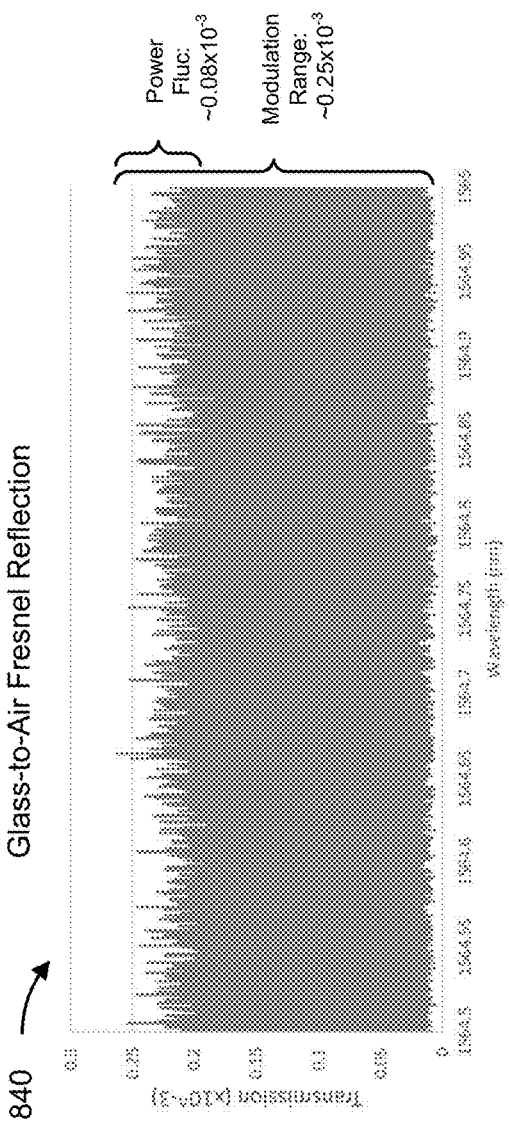
FIGS. 8A-8D depict an example optical device described herein and associated charts.
Figure 8C:
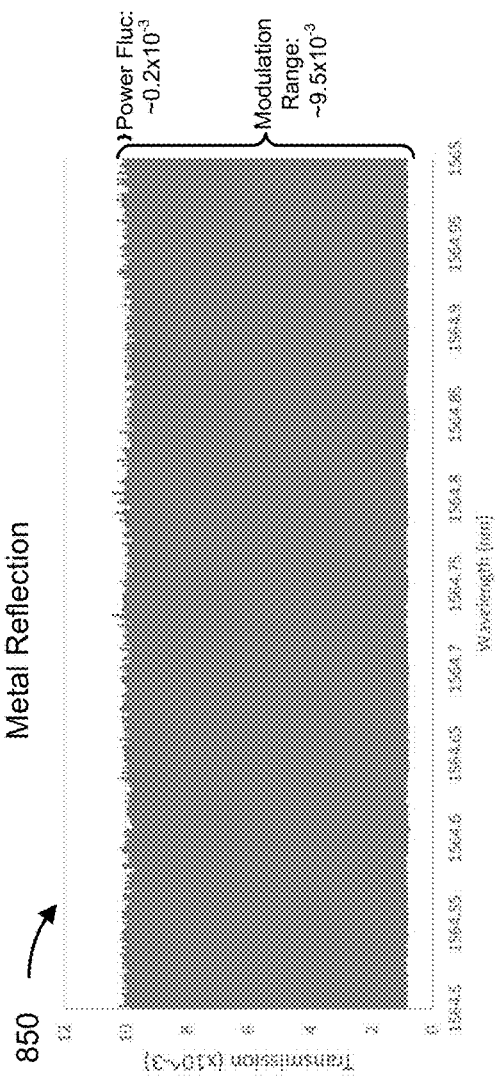
Figure 8A:
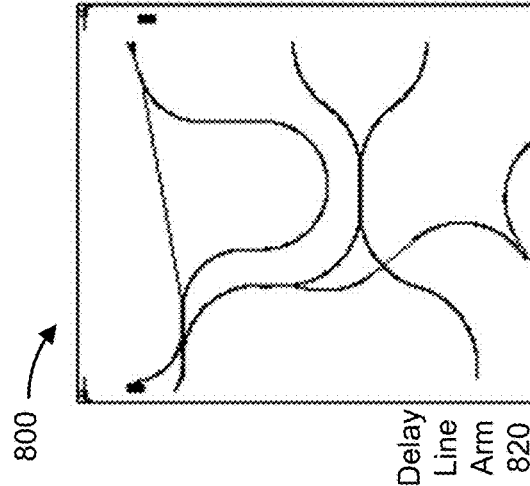

FIGS. 8A-8D depict an example optical device 800 described herein and associated charts. As shown in FIG. 8A, the optical device 800 may include an MZI 810 that includes a delay line arm 820 with a mirrored facet 830 at the end of the delay line arm 820. The delay line arm 820 may be positioned in a spiral configuration with the mirrored facet 830 positioned within the spiral configuration. As further shown in FIG. 8A, the delay line arm 820 may have a length of approximately 4 m (and a total optical length for light propagating through the MZI 810 via the delay line arm 820 may be approximately 6 m). The delay line arm 820 may have 88 loops in the spiral configuration (e.g., around a center point of the spiral configuration) and may have a pitch (e.g., a distance between two loops of the delay line arm 820 in the spiral configuration) of 16 μm.

As shown in FIG. 8B and chart 840, when the mirrored facet 830 is non-metallized (e.g., light is reflected by the mirrored facet via Fresnel reflection, such as due to a glass-to-gas transition), the MZI 810 has a modulation range of approximately $0.25 \times 10^{-3}$ and a power fluctuation of approximately $0.08 \times 10^{-3}$ for wavelengths between 1564.5 and 1565 nm. As shown in FIG. 8C and chart 850, when the mirrored facet 830 is metallized (e.g., light is reflected by the mirrored facet via a metal layer formed on the mirrored facet), the MZI 810 has a modulation range of approximately $9.5 \times 10^{-3}$ and a power fluctuation of approximately $0.2 \times 10^{-3}$ for wavelengths between 1564.5 and 1565 nm. Accordingly, in this case, the power fluctuation compared to the modulation range when the mirrored facet 830 is metallized $$(\text{e.g.,} \frac{0.2 \times 10^{-3}}{9.5 \times 10^{-3}} = 0.021)$$

is less than when the mirrored facet is non-metallized $$(\text{e.g.,} \frac{0.08 \times 10^{-3}}{0.25 \times 10^{-3}} = 0.32).$$

Figure 8D:
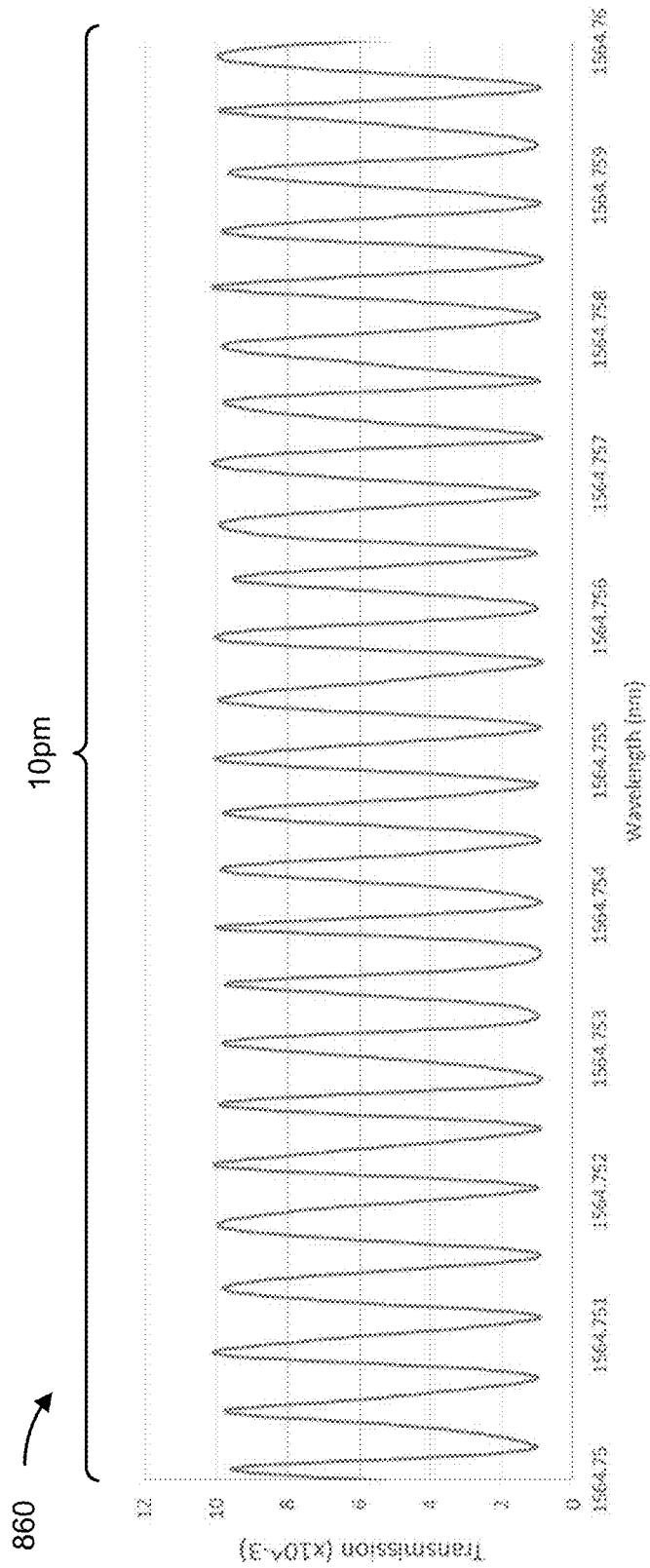

As shown in FIG. 8D and chart 860, the MZI 810 has a free spectral range of approximately 0.42 pm regardless of whether the mirrored facet 830 is non-metallized or metallized.

As indicated above, FIGS. 8A-8D depict one or more examples. Other examples may differ from what is described with regard to FIGS. 8A-8D.

The foregoing disclosure provides illustration and description, but is not intended to be exhaustive or to limit the implementations to the precise form disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, etc., depending on the context.

As used herein the term "layer" is intended to be broadly construed as one or more layers and includes layers oriented horizontally, vertically, or at other angles Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A Mach-Zehnder interferometer (MZI), comprising:
   a delay line arm formed in a chip configured to propagate light to a mirrored facet formed in the chip; and
   the mirrored facet configured to reflect, to the delay line arm, a percentage of the light propagated to the mirrored facet by the delay line arm,
   wherein the mirrored facet comprises a trench,
   wherein a first surface of the trench is configured to reflect the percentage of the light, and
   wherein a second surface of the trench, opposite the first surface, is angled non-parallel to the first surface to reflect light that passes through the trench away from the delay line arm.

2. The MZI of claim 1, wherein the mirrored facet is an etched facet of the chip.

3. The MZI of claim 1, wherein the mirrored facet is metallized to increase the percentage of the light reflected at the mirrored facet.

4. The MZI of claim 1, wherein the delay line arm is positioned in a spiral configuration, and
wherein the mirrored facet is positioned within the spiral configuration.

5. The MZI of claim 1, wherein the delay line arm is positioned in an arc configuration, and
wherein the mirrored facet is positioned at end of the delay line arm.

6. The MZI of claim 1, wherein:
the mirrored facet has an approximately 90% reflectivity; and
another mirrored facet of a non-delay line arm of the MZI has an approximately 4% reflectivity.

7. A Mach-Zehnder interferometer (MZI), comprising:
a first mirrored facet formed in a chip;
a second mirrored facet formed in the chip;
an optical transmission element formed in the chip;
a delay line waveguide formed in the chip that is connected between the optical transmission element and the first mirrored facet; and
a non-delay line waveguide formed in the chip that is connected between the optical transmission element and the second mirrored facet,
wherein the first mirrored facet comprises a first trench,
wherein a first surface of the first trench is configured opposite a second surface of the first trench, and
wherein the second surface is angled non-parallel to the first surface.

8. The MZI of claim 7, wherein the first trench is through the delay line waveguide and the second mirrored facet comprises a second trench through the non-delay line waveguide.

9. The MZI of claim 7, wherein the first mirrored facet is metallized to improve reflectivity of the first mirrored facet and the second mirrored facet is non-metallized.

10. The MZI of claim 7, wherein:
the non-delay line waveguide includes a power balancing splitter configured to reduce a power of light returning from the non-delay line waveguide to substantially match a power of light returning from the delay line.

11. The MZI of claim 7, wherein at least one of the first mirrored facet or the second mirrored facet is positioned at an edge of the chip.

12. The MZI of claim 7, wherein at least one of the first mirrored facet or the second mirrored facet is positioned in the chip and within a spiral shape formed by at least one of the delay line waveguide or the non-delay line waveguide.

13. The MZI of claim 7, wherein:
the first mirrored facet has an approximately 90% reflectivity; and
the second mirrored facet has an approximately 4% reflectivity.

14. An optical device comprising:
a substrate;
a first Mach-Zehnder interferometer (MZI) formed on the substrate, comprising:
a first delay line arm, and
a first mirrored facet positioned at an end of the first delay line arm; and
a second MZI formed on the substrate, comprising:
a second delay line arm, and
a second mirrored facet positioned at an end of the second delay line arm,
wherein at least one of the first mirrored facet or the second mirrored facet comprises a trench,
wherein a first surface of the trench is configured opposite a second surface of the trench, and
wherein the second surface is angled non-parallel to the first surface.

15. The optical device of claim 14, wherein:
the first mirrored facet is positioned at a first internal location on the substrate; and
the second mirrored facet is positioned at a second internal location on the substrate.

16. The optical device of claim 14, wherein the trench is through the first delay line arm.

17. The optical device of claim 14, wherein the trench is through the second delay line arm, and
wherein the trench includes a metal layer formed on one or more surfaces of the trench.

18. The optical device of claim 14, wherein the second delay line arm is positioned in a spiral configuration on the substrate.

19. The optical device of claim 14, wherein:
the first mirrored facet is configured to reflect a first percentage of light that propagates to the first mirrored facet via the first delay line arm; and
the second mirrored facet is configured to reflect a second percentage of light that propagates to the second mirrored facet via the second delay line arm,
wherein the first percent of light is different than the second percentage of light.

20. The optical device of claim 14, wherein:
the first mirrored facet has an approximately 90% reflectivity; and
the second mirrored facet has an approximately 4% reflectivity.

* * * * *